US007914865B2

(12) United States Patent
Siddiqui

(10) Patent No.: US 7,914,865 B2
(45) Date of Patent: *Mar. 29, 2011

(54) FROSTED ARTICLES, FROSTING LIQUIDS, AND FROSTING METHODS

(75) Inventor: Sarfraz Ahmed Siddiqui, Pearland, TX (US)

(73) Assignee: International Cellulose Corporation, Houston, TX (US)

( * ) Notice: Subject to any disclaimer, the term of this patent is extended or adjusted under 35 U.S.C. 154(b) by 953 days.

This patent is subject to a terminal disclaimer.

(21) Appl. No.: 11/820,211

(22) Filed: Jun. 18, 2007

(65) Prior Publication Data

US 2008/0003437 A1    Jan. 3, 2008

Related U.S. Application Data

(63) Continuation-in-part of application No. 11/136,871, filed on May 25, 2005, now Pat. No. 7,244,508.

(51) Int. Cl.
*B32B 17/10* (2006.01)

(52) U.S. Cl. ....... 428/34.7; 428/34.6; 428/441; 428/442

(58) Field of Classification Search .................. 428/34.6, 428/34.7, 441, 442
See application file for complete search history.

(56) References Cited

U.S. PATENT DOCUMENTS

| | | | |
|---|---|---|---|
| 1,904,318 A | 4/1933 | Lehere | |
| 2,740,957 A | 4/1956 | Davies | 340/380 |
| 3,835,562 A | 9/1974 | Thistlethwaite et al. | 40/155 |
| 3,983,307 A | 9/1976 | Power et al. | 428/503 |
| 4,139,514 A | 2/1979 | Bassett | 524/824 |
| 4,892,906 A | 1/1990 | Pham et al. | 524/730 |
| 5,006,578 A | 4/1991 | Masuda et al. | 524/128 |
| 5,038,542 A | 8/1991 | Kline | 52/306 |
| 5,230,934 A | 7/1993 | Sakano et al. | 428/35.7 |
| 5,271,768 A | 12/1993 | Morishima et al. | 106/287.16 |
| 5,328,975 A | 7/1994 | Hanson et al. | 528/29 |
| 5,520,952 A | 5/1996 | Tanitsu et al. | 427/58 |
| 5,787,627 A | 8/1998 | Snoke et al. | 40/791 |
| 5,916,938 A | 6/1999 | Brunnemann et al. | 524/128 |
| 6,193,831 B1 | 2/2001 | Overcash et al. | 156/230 |
| 6,476,093 B1 | 11/2002 | Araki et al. | 522/83 |
| 6,641,755 B2 | 11/2003 | Tomoike et al. | 252/301.35 |
| 6,777,092 B1 | 8/2004 | Hayashi et al. | 428/429 |
| 6,899,958 B2 | 5/2005 | Bayless | 428/522 |
| 7,022,387 B1 | 4/2006 | Fertig | 428/34.4 |
| 2003/0150729 A1 | 8/2003 | Retzlaff et al. | 204/489 |
| 2004/0049052 A1 | 3/2004 | Reinehr et al. | 548/217 |
| 2004/0058078 A1 | 3/2004 | Stevenson et al. | 427/385.5 |
| 2004/0067311 A1 | 4/2004 | Baudin et al. | 427/310 |
| 2006/0047051 A1 | 3/2006 | Ma et al. | 524/492 |

FOREIGN PATENT DOCUMENTS

EP    1.024.180    12/1998
JP    9 272778    10/1997

OTHER PUBLICATIONS

Int'l Search Report. PCT/GB2006/050120. 3 pp.; Aug. 25, 2006.
PCT Written Opinion of the Int'l Searching Authority; PCT/GB2006/050120: 4 pp. Aug. 25, 2006.

*Primary Examiner* — D. S Nakarani
(74) *Attorney, Agent, or Firm* — Guy McClung

(57) ABSTRACT

A solid frosted article including a substrate, a film formed on the substrate, the film comprising a frosting coating, the frosting coating comprising thermoset acrylic resin, polymethyl methacrylate, polyacrylate copolymer, and methylated melamine-formaldehyde resin, and wherein the one of a solid frosted article is glass block, glass panel and glass bottle. This abstract is provided to comply with the rules requiring an abstract which will allow a searcher or other reader to quickly ascertain the subject matter of the technical disclosure. It is submitted with the understanding that it will not be used to interpret or limit the scope or meaning of the claims, 37 CFR 1.72(b).

18 Claims, 3 Drawing Sheets

FIG. 3A
(PRIOR ART)
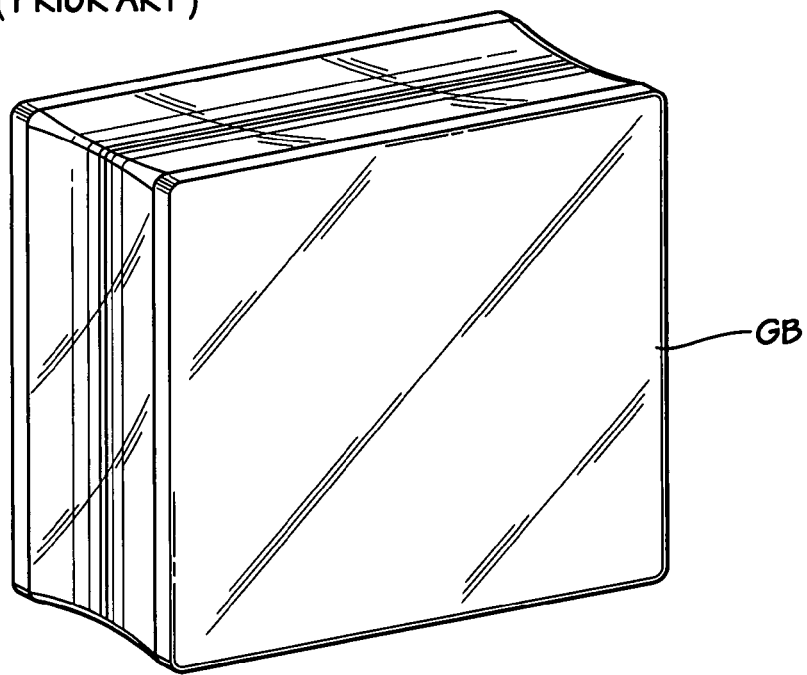
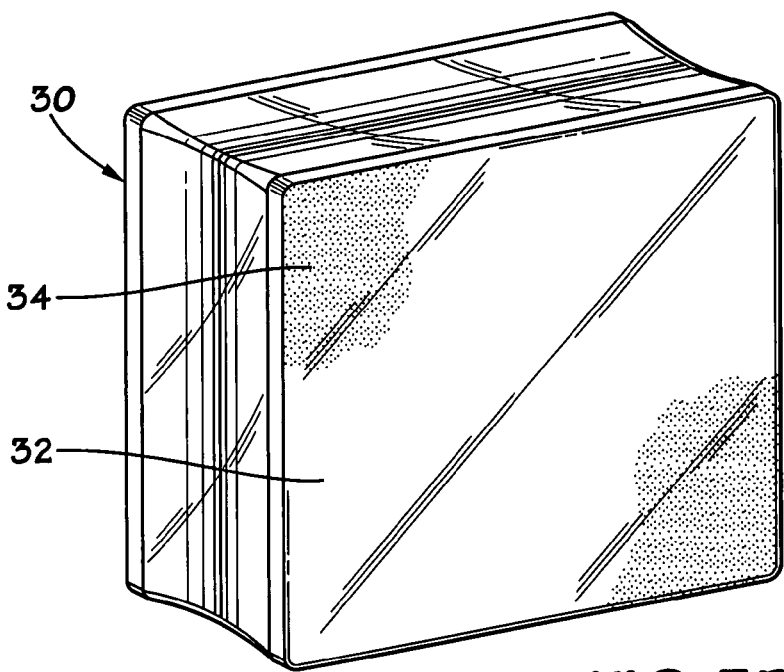
FIG. 3B

FROSTED ARTICLES, FROSTING LIQUIDS, AND FROSTING METHODS

CROSS-REFERENCE TO RELATED APPLICATIONS

This application is a continuation-in-part of U.S. patent application Ser. No. 11/136,871, filed May 25, 2005, now U.S. Pat. No. 7,244,508 said application co-owned with the present invention and incorporated fully herein for all purposes and from which application the present invention and application claim priority under the Patent Laws.

BACKGROUND OF THE INVENTION

1. Field of the Invention

The present invention is directed to frosting coating materials, coated articles, coating methods, and, in certain particular aspects, to coating methods and materials useful in producing a frosted plastic or glass article.

2. Description of Related Art

A substrate of glass or plastic may become frosted when a surface temperature thereof is heated, e.g. to 355-365 degrees F. and then cooled to room temperature. In certain prior art methods, a frosting coating is provided with, e.g. thermosetting polymers and other chemicals which produce a frosting effect due to moisture adjustment (expulsion) by heating. The prior art discloses a wide variety of systems and methods for coating articles to produce a frosted article. U.S. Pat. Nos. 6,476,093; 6,777,092; 6,641,755; 5,916,938; 6,193,831; U.S. Applications published with numbers 20040049052, 20040058078, and 20040067311; and the references listed in these patents and applications provide a sampling of related art and of frosted articles (e.g. lenses, U.S. Pat. Nos. 5,015,523 and 5,458,820; mirrors and prisms, U.S. Pat. Nos. 4,898,435 and 5,513,039; and optical elements, U.S. Pat. Nos. 6,582,884, 5,933,273, and 5,621,838).

Frosted articles and frosted glass plastic containers are well known and are used for foods, beverages, alcoholic liquors, cosmetics and other materials because they prevent UV transmission and/or improve a design with decoration and an impression of quality or artistry. In many prior art methods, to finish a surface of a glass container so it is frosted, a method is used in which the surface is etched with a hydrofluoric acid solution with added salts such as ammonium fluoride, or a mixed solution of hydrofluoric acid and sulfuric acid with added salts such as ammonium fluoride. Such a method can provide a frosted surface, but the use of a strong acid, such as hydrofluoric acid as an etching agent, can make the handling of agents difficult and can require washing with an acid and water. The treatment of resulting acidic waste water can present problems regarding safety, environment, productivity, and cost. A method for finishing a surface of a glass container without using such harmful agents includes mixing a fine silica particle as a matting agent into a thermosetting resin or a photocurable resin to form a frosted coating on the surface of the glass container (see, e.g. JP-A 2518/1978 and JP-B 68418/1993); but when such a frosted glass container is immersed into a washing solution such as an aqueous sodium hydroxide solution in a step of alkali washing, the coating can turn white and can peel from the container and, when such a glass container passes through an alkali washing line or a bottling line, cracking and peeling of the coating can occur by collision between bottles due to insufficient impact resistance of the coating. One attempted solution to these problems disclosed in U.S. Pat. No. 6,476,093 is a frost-coating composition, which includes a hydrophobic silica particle or a polymer particle, in addition to a photocurable compound; and a frosted glass container coated with such a composition. One such frost-coating composition includes 5-50 parts by weight of a hydrophobic fine silica particle based on 100 parts by weight of a photocurable compound, such that said frost-coating composition forms a frosted coating having alkaline resistance. Certain coatings of U.S. Pat. No. 6,476,093 include a solvent-based solution with a relatively high VOC content and, in certain manufacturing processes an epoxy polymer solution is heated for a minimum of two hours at one hundred fifty degrees centigrade.

There is a need, recognized by the present inventor, for efficient and effective materials and methods for frosting coatings.

There is a need, recognized by the present inventor, for such frosting coating materials and methods useful for producing a coating with high surface hardness to combat undesirable etching, e.g. acid etching, of an article.

BRIEF SUMMARY OF THE INVENTION

The present invention discloses, in certain aspects, frosting coatings, methods for producing them, and articles with such coatings. In certain aspects, a frosting coating material according to the present invention forms an insoluble coating film that is hydrophobic; permanent; resistant to mild acids, alkalis, alcohols, abrasion, and scratching; excellent in surface hardness; and, optionally, UV absorbent and/or light stabilized. Such coatings according to the present invention may be used on plastic or glass substrates, such as glasses, wine bottles, jars, containers, laminated glass or plastic (e.g., in the architectural, cosmetic, pharmaceutical and food industries) lenses, optical parallel plates, optical mirrors, elements, prisms, glass articles, and/or plastic articles; and/or for decoration on such items; and/or on articles to produce frosted articles as disclosed in the patents and patent application references previously incorporated herein by reference.

In certain aspects, the present invention provides a coating material for a frosting coating film that is hydrophobic; permanent; resistant to mild acids, alkalis, alcohols, abrasion, and scratching; UV light absorbent; and excellent in surface hardness.

In certain aspects, the present invention provides frosted articles with a coating film according to the present invention.

Accordingly, the present invention includes features and advantages which are believed to enable it to advance frosted coating technology. Characteristics and advantages of the present invention described above and additional features and benefits will be readily apparent to those skilled in the art upon consideration of the following detailed description of preferred embodiments and referring to the accompanying drawings.

Certain embodiments of this invention are not limited to any particular individual feature disclosed here, but include combinations of them distinguished from the prior art in their structures, functions, and/or results achieved. Features of the invention have been broadly described so that the detailed descriptions that follow may be better understood, and in order that the contributions of this invention to the arts may be better appreciated. There are, of course, additional aspects of the invention described below and which may be included in the subject matter of the claims to this invention. Those skilled in the art who have the benefit of this invention, its teachings, and suggestions will appreciate that the conceptions of this disclosure may be used as a creative basis for designing other structures, methods and systems for carrying out and practicing the present invention. The claims of this invention are to be read to include any legally equivalent devices or methods which do not depart from the spirit and scope of the present invention.

What follows are some of, but not all, the objects of this invention. In addition to the specific objects stated below for at least certain preferred embodiments of the invention, there are other objects and purposes which will be readily apparent to one of skill in this art who has the benefit of this invention's teachings and disclosures. It is, therefore, an object of at least certain preferred embodiments of the present invention to provide the embodiments and aspects listed above and:

New, useful, unique, efficient, non-obvious frosted articles, frosting liquids and frosting methods.

The present invention recognizes and addresses the problems and needs in this area and provides a solution to those problems and a satisfactory meeting of those needs in its various possible embodiments and equivalents thereof. To one of skill in this art who has the benefits of this invention's realizations, teachings, disclosures, and suggestions, various purposes and advantages will be appreciated from the following description of preferred embodiments, given for the purpose of disclosure, when taken in conjunction with the accompanying drawings. The detail in these descriptions is not intended to thwart this patent's object to claim this invention no matter how others may later attempt to disguise it by variations in form or additions of further improvements.

The Abstract that is part hereof is to enable the U.S. Patent and Trademark Office and the public generally, and scientists, engineers, researchers, and practitioners in the art who are not familiar with patent terms or legal terms of phraseology to determine quickly from a cursory inspection or review the nature and general area of the disclosure of this invention. The Abstract is neither intended to define the invention, which is done by the claims, nor is it intended to be limiting of the scope of the invention or of the claims in any way.

It will be understood that the various embodiments of the present invention may include one, some, or all of the disclosed, described, and/or enumerated improvements and/or technical advantages and/or elements in claims to this invention.

BRIEF DESCRIPTION OF THE SEVERAL
VIEWS OF THE DRAWINGS

A more particular description of embodiments of the invention briefly summarized above may be had by references to the embodiments which are shown in the drawings which form a part of this specification. These drawings illustrate certain preferred embodiments and are not to be used to improperly limit the scope of the invention which may have other equally effective or legally equivalent embodiments.

FIG. 3A is a perspective view of a prior art glass block.

FIG. 3B is a perspective view showing the glass block of FIG. 3A frosted according to the present invention.

Figure 1A:
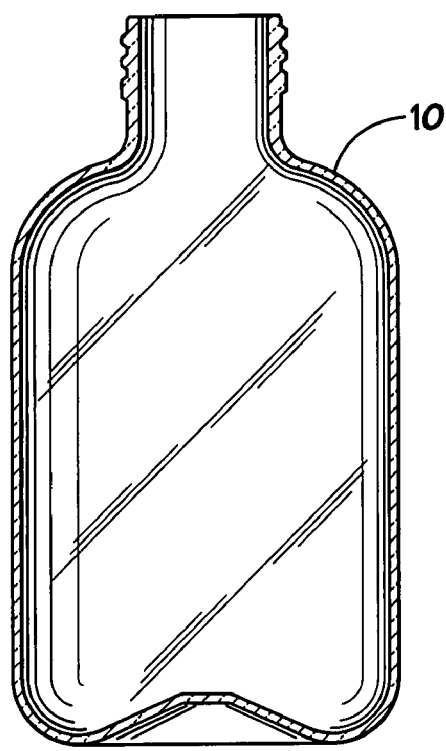
FIG. 1A is a cross-section view of a prior art bottle.
Figure 1B:
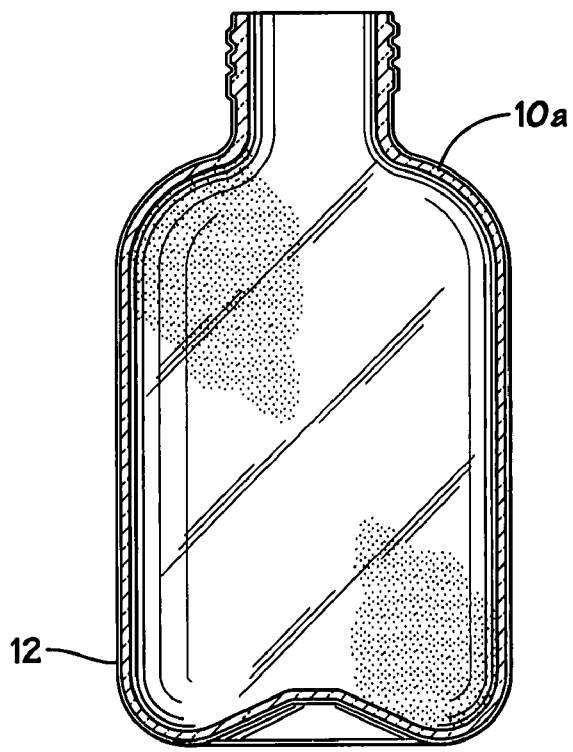
FIG. 1B is a cross-section view of a bottle with frosting according to the present invention.
Figure 1C:
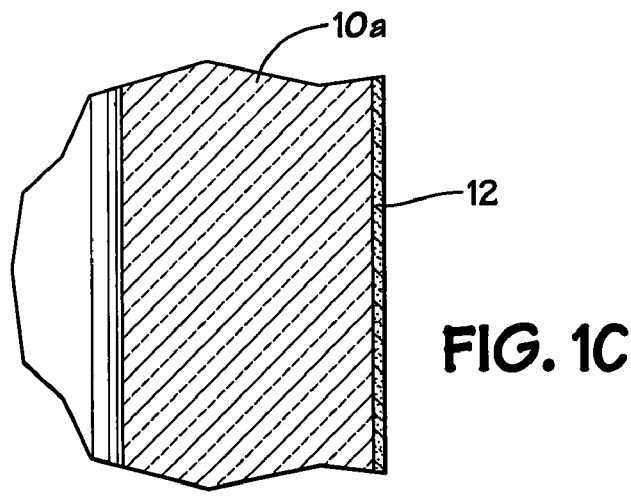
FIG. 1C is an enlarged view of part of the bottle of FIG. 1B.

Presently preferred embodiments of the invention are shown in the above-identified figures and described in detail below. Various aspects and features of embodiments of the invention are described below and some are set out in the dependent claims. Any combination of aspects and/or features described below or shown in the dependent claims can be used except where such aspects and/or features are mutually exclusive. It should be understood that the appended drawings and description herein are of preferred embodiments and are not intended to limit the invention or the appended claims. On the contrary, the intention is to cover all modifications, equivalents and alternatives falling within the spirit and scope of the invention as defined by the appended claims. In showing and describing the preferred embodiments, like or identical reference numerals are used to identify common or similar elements. The figures are not necessarily to scale and certain features and certain views of the figures may be shown exaggerated in scale or in schematic in the interest of clarity and conciseness.

As used herein and throughout all the various portions (and headings) of this patent, the terms "invention", "present invention" and variations thereof mean one or more embodiment, and are not intended to mean the claimed invention of any particular appended claim(s) or all of the appended claims. Accordingly, the subject or topic of each such reference is not automatically or necessarily part of, or required by, any particular claim(s) merely because of such reference. So long as they are not mutually exclusive or contradictory any aspect or feature or combination of aspects or features of any embodiment disclosed herein may be used in any other embodiment disclosed herein.

DETAILED DESCRIPTION OF THE INVENTION

In one particular embodiment of a system and method according to the present invention, there is provided a frosting coating material or composition with: thermoset acrylic resin; polymethyl methacrylate, N,N-dimethylethanolamine (DMEA); polysiloxanes; 2-methoxymethylthoxypropanol (DPM); emulsion of wax; water based polyamide solution; methylated melamine-formaldehyde resins; and alkoxylated alcohol. The coating material may further contain hydroxyphenyl benzotriazol, bis(1,2,2,6,6-pentamethyl-4-piperidnyl)sebacate and methyl(1,2,2,6,6-pentamethyl-4-piperidnyl)sebacate. Such a frosting coating material according to the present invention may further contain hydroxyphenyl benzotriazol, bis(1,2,2,6,6-pentamethyl-4-piperidnyl)sebacate and methyl(1,2,2,6,6-pentamethyl-4-piperidnyl)sebacate. The hydroxyphenyl benzotriazol, bis(1,2,2,6,6-pentamethyl-4-piperidnyl)sebacate and methyl(1,2,2,6,6-pentamethyl-4-piperidnyl)sebacate may preferably be used in 2-3 wt. parts (as solid) per 100 wt. parts (as solid) of the total of the thermoset acrylic resin material.

In one aspect a frosted article according to the present invention is prepared by blending components of the frosting coating material to form a cloudy coating liquid. Then, the coating liquid is applied onto at least one surface of a substrate (e.g. of a glass or plastic item) and dried to a cured coating solution under heating in an oven, e.g. for at least ten minutes at a temperature of at least 350° F., or in a temperature range between 350-375° F. to provide a frosted article according to the present invention. Such a coating may be 0.002 inches thick. Such coating may be repeated several times, as desired, to provide an increased thickness of the coating film, with or without heating after each application. The heating may also be performed after several coating applications.

Coating films according to the present invention may have a thickness of between 0.001-0.020 inches, e.g., for a cosmetic bottle between 0.001-0.010 inches and e.g. for window panels between 0.010-0.020 inches. The coating film thickness may be adjusted appropriately by applying a thinner or thicker layer of the coating liquid or by repeatedly applying the coating liquid in superposed applications.

In one preferred embodiment of the frosting coating material according to the present invention, N,N-dimethylethanolamine (DMEA), methylated melamine-formaldehyde resin is mixed with water to form (e.g. agitated for 5 minutes) a uniform coating mixture liquid. Then polysiloxanes, emulsion of wax, water based polyamide solution, alkoxylated alcohol and polymethyl methacrylate are added, preferably with continuous high speed mixing, e.g. using a five horsepower floor-mounted electric-powered high speed dispenser running at a speed of 2500 rpm. The mixing speed is reduced (e.g. to 1200 rpm) and thermoset acrylic resin is added. For UV light absorbance properties hydroxyphenyl benzotriazol, bis(1,2,2,6,6-pentamethyl-4-piperidnyl)sebacate and methyl (1,2,2,6,6-pentamethyl-4-piperidnyl) sebacate are added to the uniform coating mixture liquid, which may be dried to provide a uniform film layer through uniform drying.

In another embodiment of the frosting coating material according to the present invention, N,N-dimethylethanolamine (DMEA), methylated melamine-formaldehyde resin, water, polysiloxanes, emulsion of wax, water based polyamide solution, alkoxylated alcohol and polymethyl methacrylate are added (to water) with, optionally, continuous high speed mixing. The mixing speed is reduced to low, followed by the addition of the thermoset acrylic resin. For UV light absorbance properties hydroxyphenyl benzotriazol, bis(1,2,2,6,6-pentamethyl-4-piperidnyl)sebacate and methyl (1,2,2,6,6-pentamethyl-4-piperidnyl) sebacate are added to the uniform coating mixture liquid, which may be dried to provide a uniform film layer through uniform drying.

In one particular embodiment—Embodiment A—according to the present invention, a coating liquid has, by weight:
N,N-dimethylethanolamine (DMEA) 3.57 wt. parts,
methylated melamine-formaldehyde resin 2.77 wt. parts,
water 60.93 wt. parts,
silicone solution 0.51 wt. parts {18.5 wt. % solution of polysiloxane in 81.5 wt. % of 2-methoxy methyl ethoxy propanol (DPM)},
polyacrylate copolymer solution 0.51 wt. parts {52.0 wt % solution of polyacrylate copolymer in 48.0 wt. % of 2-methoxy methyl ethoxy propanol (DPM)},
alkoxylated alcohol 0.51 wt. parts,
polymethyl methacrylate 4.81 wt. parts,
emulsion of wax 2.70 wt. parts (95.0 wt. % solution of non-ionic carnauba wax in 5.0 wt. % of butyl cellosolve)
polyamide aqueous solution 1.82 wt. % (20.0 wt. % solution of polyamide-based thixotrope in 7.0 wt. % propylene glycol mono methyl ether and 73.0 wt. % water),
clear water reducible thermosetting acrylic emulsion 21.86 wt. parts {75.0 wt. % in solvent (butoxyethanol/n-butanol 83/17, acid value on solid=56%, hydroxyl number on solids=54)}.

A coating liquid was prepared with the components as in Embodiment A. N,N-dimethylethanolamine (DMEA) 3.57 wt. parts, methylated melamine-formaldehyde resin 2.77 wt. parts, water 60.93 wt. parts, polysiloxane solution 0.51 wt. parts, polyacrylate copolymer solution 0.51 wt. parts, alkoxylated alcohol 0.51 wt. parts, polymethyl methacrylate 4.81 wt. parts, emulsion of carnauba wax 2.70 wt. parts, polyamide aqueous solution 1.82 wt. parts were mixed together for 30 minutes at room temperature (about 25° C.) and the resultant mixture was further stirred for 10 min. at room temperature (25° C.), followed by the addition of clear water reducible thermosetting acrylic emulsion 21.86 wt. parts, stirred for 15 minutes at ambient temperature, to produce a coating liquid (coating liquid A). This coating liquid was clear and was applied onto a glass panel by spraying, followed by 10 min. of drying in a conventional oven at 350° F. (177° C.) providing a uniform, colorless and clear coating film with a thickness of several thicknesses (from 0.005-0.010 inches). In another aspect, the thus-prepared coating liquid A was clear and applied onto a glass panel by brushing, followed by 10 minutes of drying in a conventional oven at 350° F. (177° C.), providing a uniform, colorless and clear coating film having a thickness of several thicknesses (from 0.005-0.010 inches).

In another aspect this thus-prepared coating liquid A was clear and was applied onto a glass panel by spraying, followed by 3.0 minutes of drying in a conventional infrared oven at 350° F. (177° C.), providing a uniform, colorless and clear coating film having a thickness of several thicknesses (from 0.005-0.010 inches).

In another aspect the thus-prepared coating liquid A was clear and applied onto a glass panel by brushing, followed by 3.0 minutes of drying in a conventional infrared oven at 350° F. (177° C.), providing a uniform, colorless and clear coating film having a thickness of several thicknesses (from 0.005-0.010 inches).

Such coated glass panels were then left standing in an environment of ambient temperature for 5.0 minutes for cooling.

The following tests were performed for these coated panels:

Tape adhesion as per ASTM D3359, Method A (X-cut tape test); Pencil hardness as per ASTM D3363: Abrasion resistance as per ASTM D4060; Accelerated weathering as per ASTM G23, ASTM G26 and ASTM G53; Corrosion resistance by Salt fog method as per ASTM B117; Humidity as per ASTM D2247 and D4585; and Chemical resistance using different chemicals. Test results were:

Adhesion Test

According to ASTM D-3359, apply approximately 25×12 nm of an adhesive tape was applied to the coated Aqua-222, Aqua-333UV and Aqua-444UV surface. After the snap removal (normal to surface) of the tape, no deterioration of the coating was visible with unaided eye under normal illumination.

Abrasion Test

According to ASTM D-4060 by using the equipment manufactured by Taber Instrument (Model 5130), the coated surface which can be turned on a vertical axis is contacted by two abrading wheels (Hardness: CS-10) under the load of 500 g, the coated sample is then driven to turn. After 20 circles, the coated surface does not show any evidence of damage or coating removal with unaided eye under normal illumination.

Solubility Test

The coated glass was immersed to salt water (concentration: 45 g/l) for 24 hours at room temperature. After being washed with DI water and dried up with soft cloth, the coating showed no evidence of flaking, peeling, cracking or blistering with unaided eye under normal illumination.

Humidity Test

The coated glass was exposed to an atmosphere of 90-95% relative humidity and 55° C. for 16 hours. No deterioration of the coating was visible with unaided eye under normal illumination.

Chemical Durability Test (ASTM D-1308)

With unaided eye under normal illumination, the coating showed no evidence of deterioration after one of the following agents remained on the coated surface for more than 24 hours.

Agents: Acetone; Methanol alcohol; Isopropanol alcohol; Glass polishing agent (A1302) Stamping ink; Permanent marker; Tea; Coffee; Chocolate; Glass cleaning detergents (Ajax).

Salt Spray (fog) Resistance

Also known as salt fog testing is generally conducted according to ASTM B-117. The aqua coated glass samples were prepared and suspended in a sealed chamber where they were subjected to a spray or fog of a neutral 5% salt solution atomized at a temperature of 95° F. No deterioration of the coating was visible with unaided eye under normal illumination.

QUV Accelerated Weathering (ASTM F-883)

This test reproduces the damage caused by sunlight, rain and dew. The aqua coated glass samples were prepared and placed in a chamber where they were exposed to alternating cycles of light and moisture at controlled, elevated temperatures. The QUV simulates the effect of sunlight with fluorescent ultraviolet lamps. The test simulates dew and rain with condensing humidity and water sprays.

No deterioration of the coating was visible with unaided eye under normal illumination.

One particular embodiment of a coating liquid according to the present invention—Embodiment B—has, by weight:

N,N-dimethylethanolamine (DMEA) 3.54 wt. parts,
methylated melamine-formaldehyde resin 2.75 wt. parts,
water 60.45 wt. parts,
silicone solution 0.50 wt. parts {18.5 wt. % solution of polysiloxane in 81.5 wt. % of 2-methoxy methyl ethoxy propanol (DPM)},
polyacrylate copolymer solution 0.50 wt. parts {52.0 wt.% solution of polyacrylate copolymer in 48.0 wt. % of 2-methoxy methyl ethoxy propanol (DPM)},
alkoxylated alcohol 0.50 wt. parts,
polymethyl methacrylate 4.78 wt. parts,
emulsion of wax 2.68 wt. parts (95.0 wt. % solution of non-ionic carnauba wax in 5.0 wt. % of butyl cellosolve)
polyamide aqueous solution 1.81 wt. % (20.0 wt. % solution of polyamide-based thixotrope in 7.0 wt. % propylene glycol mono methyl ether and 73.0 wt. % water),
UV absorber 0.47 wt. parts (50.0 wt. % ?-[3-[3-(2H-Benzotriazol-2-yl)-5-(1,1-dimethylethyl)-4-hydroxyphenyl]-1-oxopropyl]-hydroxypoly(oxo-1,2-ethanediyl), 38.0 wt. % ?-[3-[3-(2H-Benzotriazol-2-yl)-5-(1,1-dimethylethyl)-4-hydroxyphenyl]-1-oxopropyl]-?-[3-[3-(2H-benzotriazol-2-yl)-5-(1,1-dimethylethyl)-4-hydroxyphenyl]-1-oxopropoxy]poly(oxy-1,2-ethanediyl); 12.0 wt. % polyethyleneglycol 300, light stabilizer 0.33 wt. parts (50.0 wt. % bis(1,2,2,6,6-pentamethyl-4-piperidinyl)sebacate Molecular weight, 50.0 wt. % Methyl(1,2,2,6,6-pentamethyl-4-piperidinyl)sebacateMolecular weight: 370),
clear water reducible thermosetting acrylic emulsion 21.69 wt. parts {75.0 wt. % in solvent (butoxyethanol/n-butanol 83/17, acid value on solid=56%, hydroxyl number on solids=54)}.

A coating liquid was prepared with these components as in Embodiment B. N,N-dimethylethanolamine (DMEA) 3.54 wt. parts, methylated melamine-formaldehyde resin 2.75 wt. parts, water 60.45 wt. parts, polysiloxane solution 0.50 wt. parts, polyacrylate copolymer solution 0.50 wt. parts, alkoxylated alcohol 0.50 wt. parts, polymethyl methacrylate 4.78 wt. parts, emulsion of carnauba wax 2.68 wt. parts, polyamide aqueous solution 1.81 wt. parts, UV absorber 0.47 wt. parts, light stabilizer 0.33 wt. parts were mixed together, and the resultant mixture was further stirred for 10 min. at room temperature (25° C.), followed by the addition of clear water reducible thermosetting acrylic emulsion 21.69 wt. parts and 15 minutes of stirring at ambient temperature, producing a coating liquid (coating liquid B).

Such a coating liquid B was clear and was applied onto a glass panel by spraying, followed by 10 minutes of drying in a conventional oven at 350° F. (177° C.), providing a uniform, colorless and clear coating film having a thickness of several thicknesses (from 0.005-0.010 inches).

Such a coating liquid B was clear and was applied onto a glass panel by brushing, followed by 10 minutes of drying in a conventional oven at 350° F. (177° C.), providing a uniform, colorless and clear coating film having a thickness of several thicknesses (from 0.005-0.010 inches).

Such a coating liquid B was clear and was applied onto a glass panel by spraying, followed by 3.0 minutes of drying in a conventional infrared oven at 350° F. (177° C.), providing a uniform, colorless and clear coating film having a thickness of several thicknesses (from 0.005-0.010 inches).

Such a coating liquid B was clear and applied onto a glass panel by brushing, followed by 3.0 minutes of drying in a conventional infrared oven at 350° F. (177° C.), providing a uniform, colorless and clear coating film having a thickness of several thicknesses (from 0.005-0.010 inches).

Such coated glass panels were then left standing in an environment of ambient temperature for 5.0 minutes for cooling.

The following tests were performed for these coated panels:

Tape adhesion as per ASTM D3359, Method A (X-cut tape test); Pencil hardness as per ASTM D3363: Abrasion resistance as per ASTM D4060; Accelerated weathering as per ASTM G23, ASTM G26 and ASTM G53; Corrosion resistance by Salt fog method as per ASTM B117; Humidity as per ASTM D2247 and D4585; and Chemical resistance using different chemicals. Test results were:

Adhesion Test

According to ASTM D-3359, approximately 25×12 nm of an adhesive tape was applied to the coated Aqua-222, Aqua-333UV and Aqua-444UV surface, after the snap removal (normal to surface) of the tape, no deterioration of the coating was visible with unaided eye under normal illumination.

Abrasion Test

According to ASTM D-4060 by using the equipment manufactured by Taber Instrument (Model 5130), the coated surface which can be turned on a vertical axis was contacted by two abrading wheels (Hardness: CS-10) under the load of 500 g, the coated sample was then driven to turn. After 20 circles, the coated surface did not show any evidence of damage or coating removal with unaided eye under normal illumination.

Solubility Test

The coated glass was immersed to salt water (concentration: 45 g/l) for 24 hours at room temperature. After being washed with DI water and dried up with soft cloth, the coating showed no evidence of flaking, peeling, cracking or blistering with unaided eye under normal illumination.

Humidity Test
> The coated glass is exposed to an atmosphere of 90-95% relative humidity and 55° C. for 16 hours. No deterioration of the coating was visible with unaided eye under normal illumination.

Chemical Durability Test (ASTM D-1308)
> With unaided eye under normal illumination, the coating showed no evidence of deterioration after one of the following agents remained on the coated surface for more than 24 hours.

Agents: Acetone; Methanol alcohol; Isopropanol alcohol; Glass polishing agent (A1302) Stamping ink; Permanent marker; Tea; Coffee; Chocolate; Glass cleaning detergents (Ajax).

Salt Spray (Fog) Resistance
> Also known as salt fog testing is generally conducted according to ASTM B-117. The aqua coated glass samples were prepared and suspended in a sealed chamber where they were subjected to a spray or fog of a neutral 5% salt solution atomized at a temperature of 95° F. No deterioration of the coating was visible with unaided eye under normal illumination.

QUV Accelerated Weathering (ASTM F-883)
> This test reproduces the damage caused by sunlight, rain and dew. The aqua coated glass samples were prepared and placed in a chamber where they were exposed to alternating cycles of light and moisture at controlled, elevated temperatures. The QUV simulates the effect of sunlight with fluorescent ultraviolet lamps. The test simulates dew and rain with condensing humidity and water sprays.

No deterioration of the coating was visible with unaided eye under normal illumination.

The present invention provides a frosted article with: a substrate and a coating film formed on the substrate (any coating disclosed herein), e.g., but not limited to, a coating formed by application of a solution containing a thermoset acrylic resin, polymethyl methacrylate, N,N-dimethylethanolamine (DMEA), polysiloxanes, 2-methoxymethylthoxypropanol (DPM), emulsion of wax, water based polyamide solution, methylated melamine-formaldehyde resins and alkoxylated alcohol and hydroxyphenyl benzotriazol, bis(1,2,2,6,6-pentamethyl-4-piperidnyl)sebacate and methyl(1,2,2,6,6-pentamethyl-4-piperidnyl)sebacate. These coatings can be applied by spraying, e.g. with a High Volume Low Pressure (HVLP) unit, e.g. a Campbell Hausfeld HVLP Spray gun; and/or they can be brushed on with a typical paint brush or paint roller.

In certain aspects a frosting coating film formed of the frosting coating material according to the present invention is water-insoluble, and has a high surface hardness and excellent durability. Without being tied to any specific theory, process or mechanism, it is noted that such properties in certain aspects according to the present invention may be attributable to an improved-mutual solubility between the thermoset acrylic resin, polymethyl methacrylate, N,N-dimethylethanolamine (DMEA), and methylated melamine-formaldehyde resin. More specifically, a thermoset acrylic resin compound and methylated melamine-formaldehyde resin form a uniform coating film. The coating film is hard, excellent in durability and water-insoluble. This is presumably because the improved mutual solubility between the polyacrylic resin compound and methylated melamine-formaldehyde resin promotes mutual interaction of polymer chains of these compounds to provide an insoluble coating film.

In certain particular embodiments a coating liquid for Embodiment A or Embodiment B contains the following ingredients (and the liquid is mixed and prepared in any method as described above for these embodiments):

1. An hydroxyl functional thermosetting water reducible acrylic resin which is reduced to about 30% solids by weight in water at a pH between 8.0 to 8.5 assisted by DMEA to become completely soluble in water.
2. Particulate material for a frosting appearance; e.g. fine particle silica and/or polymethyl methacrylate polymer.
3. A tertiary amine (e.g. DMEA) which combines characteristics of amines and alcohols, increases resin solubility, and improves solution stability by reducing pH drift (a natural phenomenon in which pH changes). This ingredient improves adhesion to glass and improves scratch and rub resistance properties.
4. A silicone defoamer for aqueous systems which inhibits or destroys foam created in the coating manufacturing process, combined with a solvent used in the formulation (e.g. 2-methoxy methyl ethoxy propanol solvent).
5. An additive to improve leveling (achieving a desired degree of flatness of a film surface) without adversely affecting surface tension, e.g. a solution of polyacrylate copolymers.
6. A polyamide thixotrope which becomes active when heated, e.g. a water-based polyamide solution which has good stability upon aging, good shear thinning (the ability to become sufficiently, even highly, fluid during application), non-seeding (prevention of undesirable particle aggregation and/or of coating defects due to material insolubility) and optimum anti-sagging/anti-settling properties.
7. A cross linking agent, e.g. a commercial grade hexamethoxy methyl melamine in liquid form (preferably a greater-than 98% non-volatile form) used as a cross linking agent with the thermoset acrylic resin (to become soluble in water) to produce good hardness in coating film flexibility
8. A foam-inhibiting and substrate wetting agent, e.g. a silicone-free additive for aqueous systems (e.g. alkoxylated alcohol).

According to the present invention, in a coating liquid according to the present invention, of the eight ingredients listed above, ingredients 3, 4, 5, 6, and 8 are optional.

Regarding the embodiments described above, a coating liquid prepared according to any of them can be manually applied, sprayed on, or roller coated (onto glass).

By changing the concentration of ingredients 1-8 listed above different properties and different levels of properties can be achieved in a final coating.

In other embodiments of the present invention, one, some, or all of the following ingredients are used:

9. A UV-filtering additive (e.g. certain hindered amine UV light stabilizers) which converts ultraviolet light waves into energy emitted in the infrared portion of the electromagnetic spectrum and does not produce infrared energy at levels which can damage certain items (e.g. artworks on canvas, parchment, cloth, paper, or the like); in one aspect an additive which blocks harmful UV from 70% to 99.9%, and, in one particular aspect, which blocks 99% or more (e.g. 99.9%) of UV at wavelengths of 300-380 nm) in very thin films, e.g. about 1 mil thick or less.
10. A slow evaporating ether-ester solvent with good film formation properties due to enhanced flow and leveling characteristics, low surface tension with ether-ester functionality (e.g. UCAR Ester EEP or ethyl 3-ethoxy propionate)

11. A synthetic paraffin used to provide a smooth feel, lubricity, and gloss control (e.g. a modified amide wax)
12. An additive used to form a thin layer (e.g. less than one micron) on a coating's surface improving slip (level of frictional resistance) blocking (high volatility materials which improve escape from drying films) mar resistance and scratch resistance (e.g. a polyether-modified methyl polysiloxane additive with, as an active ingredient, 75% by weight Dowanol DPnB (dipropylene glycol n-butyl ether).
13. A toughening additive to toughen a coating and improve chemical resistance and cure at reduced temperatures, (e.g. an amine blocked sulfonic acid catalyst).
14. A dye to reduce yellowness in a coating surface, e.g. anthraquinine dye C.I. (e.g. Acid Violet 43).
15. An additive with a high degree of toughness and lubricity to increase rub resistance, abrasion resistance and slip properties, e.g. a combination of polyethylene waxes and polytetrafluoroethylene (PTFE) (in one aspect, added in powder form).

According to the present invention, each ingredient 9-15 listed above is optional for a coating liquid according to the present invention.

In one particular embodiment, to produce a coating liquid according to the present invention, the following ingredients are mixed together in a blending apparatus with water at a slow speed and, optionally the resulting liquid is filtered e.g. using a 50 micron mesh filtration bag:

1. Water
2. Thermoset acrylic resin (water reducible acrylic
3. N,N-dimethylethanolamine (DMEA)
4. Polysiloxanes
5. Polyacrylate copolymer
6. Water based polyamide solution
7. Methylated melamine-formaldehyde resin
8. Alkoxylated alcohol
9. Polymethyl methacrylate
10. SCAR Ester EEP
11. Modified amide wax
12. Polyether-modified methyl polysiloxane
13. Amine blocked sulfonic acid catalyst
14. Polyethylene waxes and polytetrafluorethylene
15. Hindered amine UV light stabilizer
16. Anthraquinone Dye, C.I.

In certain specific preferred embodiments of coating liquids according to the present invention, the ingredients listed above are used and adjusted for coating, preferably, specific items. Some of these are described below.

Coating Liquid I can be used to coat, e.g. wine bottles, glassware, dishes and vases.

Coating Liquid II, a UV blocking waterborne glass coating which filters ultraviolet (UV) damaging rays, can be used to coat wine bottles, glassware, dishes and vases.

Coating Liquid III can be used for decoration of automotive windshields, glass-topped stoves and oven doors, shower doors and frosted or decorated glass panels. Coating Liquid III filters about 70% of ultraviolet light in the 300-380 nm wavelength range.

Coating Liquid IV can be used for decoration of automotive windshields, glass-topped stoves and oven doors, shower doors and frosted or decorated glass panels. Coating Liquid IV filters 98% of ultraviolet light in the 300-380 nm wavelength range.

Coating Liquid V can be used for glass for framing artworks and glass for "high-end framing." This is known (e.g. in USA) as "non-glare" and (incorrectly) as non-reflecting glass with one or both surfaces altered to scatter or diffuse the reflected portion of visible light. Coating Liquid filters 70% of ultraviolet light in the 300-380 nm wavelength range.

Coating Liquid VI can be used for glass for framing art works and for glass for "high-end framing." Coating Liquid VI filters 98% of ultraviolet light in the 300-380 nm wavelength range.

Coating Liquid VII can be used to produce a very thin coating.

| Coating Liquid I | By Weight % |
| --- | --- |
| 1. Water | 60.81 |
| 2. Thermoset acrylic resin (water reducible acrylic) | 18.97 |
| 3. N,N-dimethylethanolamine (DMEA) | 1.57 |
| 4. Polysiloxanes | 0.20 |
| 5. Polyacrylate copolymer | 0.20 |
| 6. Water based polyamide solution | 0.78 |
| 7. Methylated melamine-formaldehyde resin | 7.44 |
| 8. Alkoxylated alcohol | 0.20 |
| 9. Polymethyl methacrylate | 0.60 |
| 10. SCAR Ester EEP | 5.74 |
| 11. Modified amide wax | 0.20 |
| 12. Polyether-modified methyl polysiloxane | 0.35 |
| 13. Amine blocked sulfonic acid catalyst | 0.47 |
| 14. Polyethylene waxes and polytetrafluorethylene | 0.47 |

| Coating Liquid II | By Weight % |
| --- | --- |
| 1. Water | 50.0-65.0 |
| 2. Thermoset acrylic resin (water reducible acrylic) | 15.0-20.0 |
| 3. N,N-dimethylethanolamine (DMEA) | 1.0-3.0 |
| 4. Polysiloxanes | 0.1-0.4 |
| 5. Polyacrylate copolymer | 0.1-0.4 |
| 6. Water based polyamide solution | 1.0-2.0 |
| 7. Methylated melamine-formaldehyde resin | 5.0-9.0 |
| 8. Alkoxylated alcohol | 0.1-0.4 |
| 9. Polymethyl methacrylate | 2.0-4.0 |
| 10. SCAR Ester EEP | 4.0-7.0 |
| 11. Modified amide wax | 0.1-0.4 |
| 12. Polyether-modified methyl polysiloxane | 0.2-0.5 |
| 13. Amine blocked sulfonic acid catalyst | 0.3-0.7 |
| 14. Polyethylene waxes and polytetrafluoroethylene | 0.4-0.7 |
| 16. UV absorbency hydroxyphenyl benzotriazol | 0.2-0.4 |
| 17. Hindered amine light stabilizer bis(1,2,2,6,6-pentamethyl-4-piperidnyl)sebacate & methyl(1,2,2,6,6-pentamethyl-r-piperidnyl)sebacate | 0.1-0.3 |

| Coating Liquid III | By Weight % |
| --- | --- |
| 1. Water | 50.0-70.0 |
| 2. Thermoset acrylic resin (water reducible acrylic) | 17.0-25.0 |
| 3. N,N-dimethylethanolamine (DMEA) | 0.5-1.5 |
| 4. Polysiloxanes | 0.1-0.3 |
| 5. Polyacrylate copolymer | 0.1-0.3 |
| 6. Water based polyamide solution | 0.1-0.3 |
| 7. Methylated melamine-formaldehyde resin | 6.0-9.5 |
| 8. Alkoxylated alcohol | 0.1-0.3 |
| 9. Polymethyl methacrylate | 1.5-3.0 |
| 10. SCAR Ester EEP | 3.0-5.0 |
| 11. Modified amide wax | 0.1-0.3 |
| 12. Polyether-modified methyl polysiloxane | 0.1-0.3 |

| Coating Liquid III | By Weight % |
| --- | --- |
| 13. Amine blocked sulfonic acid catalyst | 0.3-0.6 |
| 14. Polyethylene waxes and polytetrafluorethylene | 0.3-0.5 |
| 15. Hindered amine UV light stabilizer | 2.0-4.0 |

| Coating Liquid IV | By Weight % |
| --- | --- |
| 1. Water | 55.0-65.0 |
| 2. Thermoset acrylic resin (water reducible acrylic) | 15.0-20.0 |
| 3. N,N-dimethylethanolamine (DMEA) | 0.5-1.5 |
| 4. Polysiloxanes | 0.1-0.3 |
| 5. Polyacrylate copolymer | 0.1-0.3 |
| 6. Water based polyamide solution | 0.3-0.7 |
| 7. Methylated melamine-formaldehyde resin | 6.0-9.0 |
| 8. Alkoxylated alcohol | 0.1-0.3 |
| 9. Polymethyl methacrylate | 2.0-4.0 |
| 10. SCAR Ester EEP | 2.5-4.5 |
| 11. Modified amide wax | 0.1-0.2 |
| 12. Polyether-modified methyl polysiloxane | 0.1-0.3 |
| 13. Amine blocked sulfonic acid catalyst | 0.3-0.6 |
| 14. Polyethylene waxes and polytetrafluorethylene | 0.7-1.0 |
| 15. Hindered amine UV light stabilizer | 5.0-8.0 |

| Coating Liquid V | By Weight % |
| --- | --- |
| 1. Water | 55.0-70.0 |
| 2. Thermoset acrylic resin (water reducible acrylic) | 18.0-25.0 |
| 3. N,N-dimethylethanolamine (DMEA) | 0.7-1.5 |
| 4. Polysiloxanes | 0.1-0.3 |
| 5. Polyacrylate copolymer | 0.1-0.3 |
| 6. Water based polyamide solution | 0.2-0.3 |
| 7. Methylated melamine-formaldehyde resin | 7.0-9.0 |
| 8. Alkoxylated alcohol | 0.1-0.3 |
| 9. Polymethyl methacrylate | 0.3-0.5 |
| 10. SCAR Ester EEP | 3.0-5.0 |
| 11. Modified amide wax | 0.1-0.3 |
| 12. Polyether-modified methyl polysiloxane | 0.2-0.3 |
| 13. Amine blocked sulfonic acid catalyst | 0.4-0.7 |
| 14. Polyethylene waxes and polytetrafluorethylene | 0.3-0.5 |
| 15. Hindered amine UV light stabilizer | 2.0-2.5 |

| Coating Liquid VI | By Weight % |
| --- | --- |
| 1. Water | 50.0-62.0 |
| 2. Thermoset acrylic resin (water reducible acrylic) | 17.0-22.0 |
| 3. N,N-dimethylethanolamine (DMEA) | 0.7-1.2 |
| 4. Polysiloxanes | 0.1-0.3 |
| 5. Polyacrylate copolymer | 0.1-0.3 |
| 6. Water based polyamide solution | 0.3-0.6 |
| 7. Methylated melamine-formaldehyde resin | 6.5-8.5 |
| 8. Alkoxylated alcohol | 0.1-0.3 |
| 9. Polymethyl methacrylate | 0.4-0.6 |
| 10. SCAR Ester EEP | 2.7-5.0 |
| 11. Modified amide wax | 0.1-0.3 |
| 12. Polyether-modified methyl polysiloxane | 0.2-0.3 |
| 13. Amine blocked sulfonic acid catalyst | 0.3-0.6 |
| 14. Polyethylene waxes and polytetrafluorethylene | 0.8-1.2 |
| 15. Hindered amine UV light stabilizer | 5.5-8.0 |

In one aspect, Coating Liquid VII is prepared by mixing the following ingredients:

| Coating Liquid VII | By Weight % |
| --- | --- |
| 1. Water | 0. |
| 2. Thermoset acrylic resin (water reducible acrylic) | . |
| 3. N,N-dimethylethanolamine (DMEA) | . |
| 4. Polysiloxanes | . |
| 5. Polyacrylate copolymer | 0. |
| 6. Water based polyamide solution | 0. |
| 7. Methylated melamine-formaldehyde resin | 7.44 |
| 8. Alkoxylated alcohol | 0.20 |
| 9. Polymethyl methacrylate | 0.60 |
| 10. SCAR Ester EEP | 5.74 |
| 11. Modified amide wax | 0.20 |
| 12. Polyether-modified methyl polysiloxane | 0.35 |
| 13. Amine blocked sulfonic acid catalyst | 0.47 |
| 14. Polyethylene waxes and polytetrafluorethylene | 0.47 |
| 15. Hindered amine UV light stabilizer | |
| 16. UV absorbency hydroxyphenyl benzotriazol | |
| 17. Hindered amine light stabilizer bis(1,2,2,6,6-pentamethyl-4-piperidnyl) sebacate & methyl (1,2,2,6,6-pentamethyl-4-piperidnyl) sebacat | |

In certain embodiments, a coating (e.g. any coating according to the present invention e.g., but not limited to, Coating Liquid I or II) is applied to a clean glass item, e.g. a bottle or block, by spraying and the coating is then baked and cooled. For example, a clean bottle 10, FIG. 1A, is sprayed with the selected coating, producing a coating 12 (not to scale, sized exaggerated as shown). The bottle 10a is then baked, e.g. in a convection oven at 350° F. (177° C.) for 10 minutes or in an infrared oven at 350° F. (177° C.) for 2 minutes. Alternatively, any coating according to the present invention (e.g., but not limited to Coating Liquids III and VI) is applied to an item, e.g. a bottle, or a glass panel with a roller or sprayed with a spray gun and baked as described above in a convection oven, an infrared oven, or both.

Figure 2A:
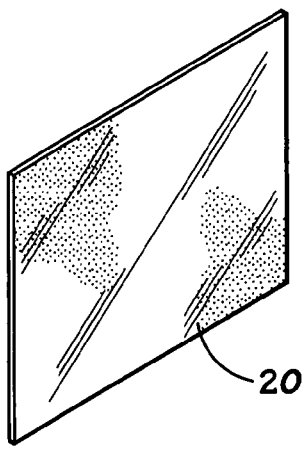
FIG. 2A is a perspective view of a prior art artwork.
Figure 2B:
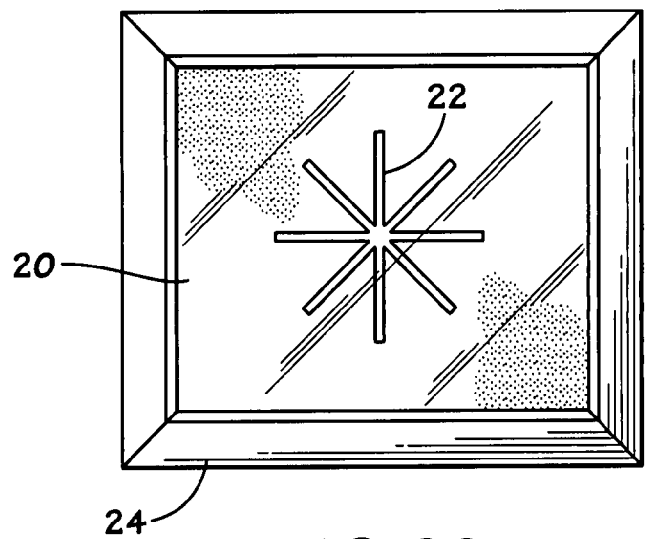
FIG. 2B is a front view of the artwork of FIG. 2A framed according to the present invention.
Figure 2C:
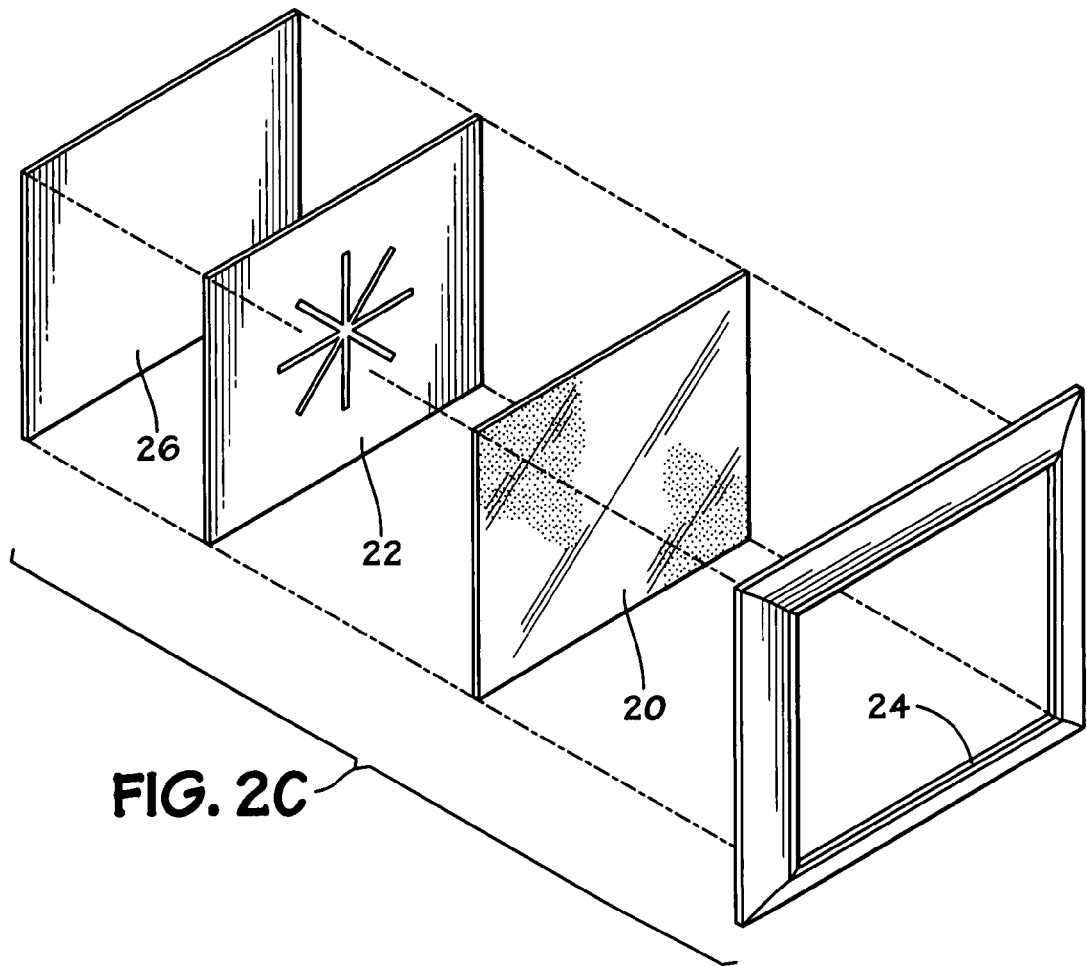
FIG. 2C is an exploded view of the framed artwork of FIG. 2B.

The methods described above according to the present invention can be used to coat and frost a pane of glass to be used to protect an artwork, e.g. a painting, print, etching, drawing, tapestry, document, photograph, or lithograph, e.g. in a frame system with a frame and/or with a backing layer, plate, or piece. For example, a piece of transparent glass 20, FIG. 2A, is coated with a coating according to the present invention, using any method or coating described above and baked according to any method according to the present invention. The coated, baked piece of glass 20 is then placed over an artwork, e.g. artwork 22 and framed with a frame 24, with a backing element 26. Optionally the backing element, frame, or both are deleted.

FIG. 3A shows a prior art glass block GB. FIG. 3B shows a glass block 30 according to the present invention which is a block like the block GB, but with a surface 32 coated with a coating 34 according to the present invention (any coating disclosed herein). The coating liquids described above are well-suited for coating glass blocks. Any and all surfaces of a glass block may be coated according to the present invention.

The present invention, therefore, in at least some, but not necessarily all embodiments, provides a solid frosted article with a a substrate, a film formed on the substrate, the film comprising a frosting coating, the frosting coating comprising thermoset acrylic resin, polymethyl methacrylate, polyacrylate copolymer, and methylated melamine-formaldehyde resin, and wherein the solid frosted article is one of a glass block, glass panel and glass bottle. Such an article may have one or some (in any possible combination) of the following: the thermoset acrylic resin includes an hydroxyl functional thermosetting water reducible acrylic resin which is reduced to about 30% solids by weight in water at a pH between 8.0 to 8.5 assisted by DMEA to become completely soluble in water; the frosting coating further including particulate material for enhancing frosting appearance; wherein the particulate material is fine particle silica; the frosting coating further including a cross linking agent for enhancing hardness and flexibility; the frosting coating further including an hydroxyl functional thermosetting water reducible acrylic resin which is reduced to about 30% solids by weight in water at a pH between 8.0 to 8.5 assisted by DMEA to become completely soluble in water, particulate material comprising fine particle silica, a tertiary amine for improving adhesion to glass and improving scratch and rub resistance, a silicone defoamer, a polyamide thixotrope activated when heated, a cross linking agent, and a foam-inhibiting and substrate wetting agent; and/or wherein the frosting coating includes UV absorber, and light stabilizer.

The present invention, therefore, in at least some, but not necessarily all embodiments, provides a solid frosted article having a substrate, a film formed on the substrate, the film comprising a frosting coating, the frosting coating comprising thermoset acrylic resin, polymethyl methacrylate, polyacrylate copolymer, and methylated melamine-formaldehyde resin, and wherein the substrate is glass panel. Such an article may have one or some (in any possible combination) of the following: an artwork adjacent the glass panel; a backing member, the artwork between the backing member and the glass panel; and/or a frame holding the glass panel.

The present invention, therefore, in at least some, but not necessarily all embodiments, provides a solid frosted article including a substrate, a film formed on the substrate, the film comprising a frosting coating, the frosting coating comprising thermoset acrylic resin, polymethyl methacrylate, polyacrylate copolymer, and methylated melamine-formaldehyde resin, and wherein the substrate is part of a glass block.

The present invention, therefore, in at least some, but not necessarily all embodiments, provides a solid frosted article including a substrate, a film formed on the substrate, the film comprising a frosting coating, the frosting coating comprising thermoset acrylic resin, polymethyl methacrylate, polyacrylate copolymer, and methylated melamine-formaldehyde resin, and wherein the substrate is part of a glass bottle.

The present invention, therefore, in at least some, but not necessarily all embodiments, provides a method for frosting a solid object; the solid object being one of a glass panel, a glass bottle, and a glass block; the method including applying a frosting coating composition to an object, the frosting coating composition comprising thermoset acrylic resin, polymethyl methacrylate, polyacrylate copolymer, and methylated melamine-formaldehyde resin. Such a method may have one or some (in any possible combination) of the following: wherein the frosting coating further comprises N,N-dimethylethanolamine (DMEA); wherein components of the frosting coating are present by weight parts as polymethyl methacrylate—4.81, polyacrylate copolymer—0.48, methylated melamine-formaldehyde resin—2.77, N,N-dimethylethanolamine—3.61; wherein said thermoset acrylic resin comprises at least one member selected from the group consisting of polyacrylic resin and polymethacrylic resin; wherein the frosting coating includes alkoxylated alcohol, and emulsion of wax; wherein the frosting coating has polyanide aqueous solution and components of the frosting coating are present by weight parts of each 100 parts as alkoxylated alcohol—0.48, polyamide aqueous solution—1.81, emulsion of wax—2.72; and/or wherein the frosting coating has UV absorbent material, and wherein the UV absorbent material is hydroxyphenyl benzotriazol and hindered amine light stabilizer bis (1,2,2,6,6-pentamethyl-4-piperidnyl)sebacate and methyl(1,2,2,6,6-pentamethyl-4-piperidnyl)sebacate.

In conclusion, therefore, it is seen that the present invention and the embodiments disclosed herein and those covered by the appended claims are well adapted to carry out the objectives and obtain the ends set forth. Certain changes can be made in the subject matter without departing from the spirit and the scope of this invention. It is realized that changes are possible within the scope of this invention and it is further intended that each element or step recited in any of the following claims is to be understood as referring to the step literally and/or to all equivalent elements or steps. The following claims are intended to cover the invention as broadly as legally possible in whatever form it may be utilized. The invention claimed herein is new and novel in accordance with 35 U.S.C. §102 and satisfies the conditions for patentability in §102. The invention claimed herein is not obvious in accordance with 35 U.S.C. §103 and satisfies the conditions for patentability in §103. This specification and the claims that follow are in accordance with all of the requirements of 35 U.S.C. §112. The inventors may rely on the Doctrine of Equivalents to determine and assess the scope of their invention and of the claims that follow as they may pertain to apparatus not materially departing from, but outside of, the literal scope of the invention as set forth in the following claims. All patents and applications identified herein are incorporated fully herein for all purposes. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. §112, paragraph 6 for any limitations of any of the claims herein, except for those in which the claim expressly uses the words 'means for' together with an associated function.

What is claimed is:

1. A solid frosted article comprising
   a substrate,
   a film formed on the substrate, the film comprising a frosting coating,
   the frosting coating comprising thermoset acrylic resin, polymethyl methacrylate, polyacrylate copolymer, and methylated melamine-formaldehyde resin, and
   wherein the solid frosted article is one of a glass block, glass panel and glass bottle.

2. The solid frosted article of claim 1, the frosting coating further comprising
   the thermoset acrylic resin comprising an hydroxyl functional thermosetting water reducible acrylic resin which is reduced to about 30% solids by weight in water at a pH between 8.0 to 8.5 assisted by N,N-dimethylethanolamine to become completely soluble in water.

3. The solid frosted article of claim 1, the frosting coating further comprising particulate material for enhancing frosting appearance.

4. The solid frosted article of claim 3 wherein the particulate material is fine particle silica.

5. The solid frosted article of claim 1, the frosting coating further comprising a cross linking agent for enhancing hardness and flexibility.

6. The solid frosted article of claim 1, the frosting coating further comprising
an hydroxyl functional thermosetting water reducible acrylic resin which is reduced to about 30% solids by weight in water at a pH between 8.0 to 8.5 assisted by N,N-dimethylethanolamine to become completely soluble in water,
particulate material comprising fine particle silica,
a tertiary amine for improving adhesion to glass and improving scratch and rub resistance,
a silicone defoamer,
a polyamide thixotrope activated when heated,
a cross linking agent, and
a foam-inhibiting and substrate wetting agent.

7. The solid frosted article of claim 1 wherein the frosting coating includes
UV absorber, and
light stabilizer.

8. A solid frosted article comprising
a substrate,
a film formed on the substrate, the film comprising a frosting coating,
the frosting coating comprising thermoset acrylic resin, polymethyl methacrylate, polyacrylate copolymer, and methylated melamine-formaldehyde resin, and
wherein the substrate comprises glass panel.

9. The solid frosted article of claim 8 further comprising an artwork adjacent the glass panel.

10. The solid frosted article of claim 9 further comprising a frame holding the glass panel.

11. The solid frosted article of claim 8 further comprising a backing member, the artwork between the backing member and the glass panel.

12. A solid frosted article comprising
a substrate,
a film formed on the substrate, the film comprising a frosting coating,
the frosting coating comprising thermoset acrylic resin, polymethyl methacrylate, polyacrylate copolymer, and methylated melamine-formaldehyde resin, and
wherein the substrate comprises part of a glass block.

13. A solid frosted article comprising
a substrate,
a film formed on the substrate, the film comprising a frosting coating,
the frosting coating comprising thermoset acrylic resin, polymethyl methacrylate, polyacrylate copolymer, and methylated melamine-formaldehyde resin, and
wherein the substrate comprises part of a glass bottle.

14. A method for frosting a solid object; the solid object comprising one of a glass panel, a glass bottle, and a glass block; the method comprising
applying a frosting coating composition to an object, the frosting coating composition comprising thermoset acrylic resin, polymethyl methacrylate, polyacrylate copolymer, and methylated melamine-formaldehyde resin.

15. The method of claim 14 wherein the frosting coating further comprises N,N-dimethylethanolamine (DMEA).

16. The frosting method of claim 15 wherein said thermoset acrylic resin comprises at least one member selected from the group consisting of polyacrylic resin and polymethacrylic resin.

17. The method of claim 15 wherein the frosting coating further comprises alkoxylated alcohol, and emulsion of wax.

18. The method of claim 14 wherein the frosting coating further comprises UV absorbent material, and
wherein the UV absorbent material is hydroxyphenyl benzotriazol and hindered amine light stabilizer bis(1,2,2,6,6-pentamethyl-4-piperidnyl)sebacate and methyl(1,2,2,6,6-pentamethyl-4-piperidnyl)sebacate.

* * * * *